P. Manny,
Mower.
No. 6,560.
Patented June 26. 1849.
2 Sheets. Sheet 2.
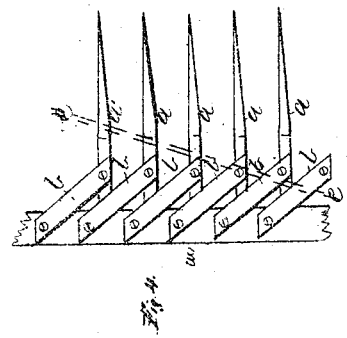
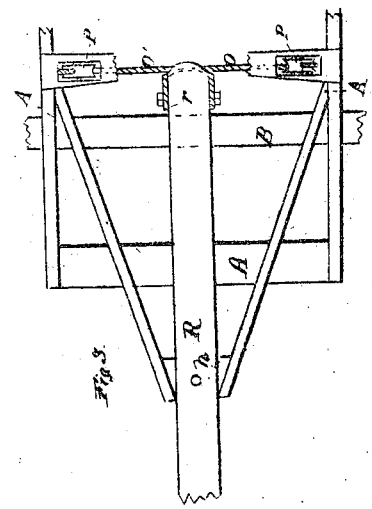
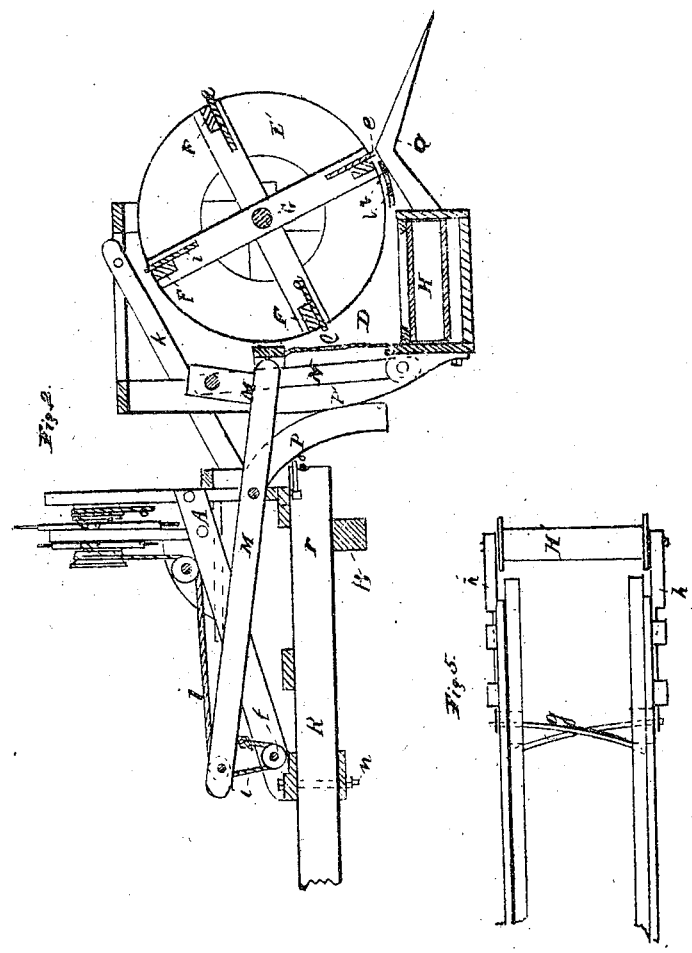

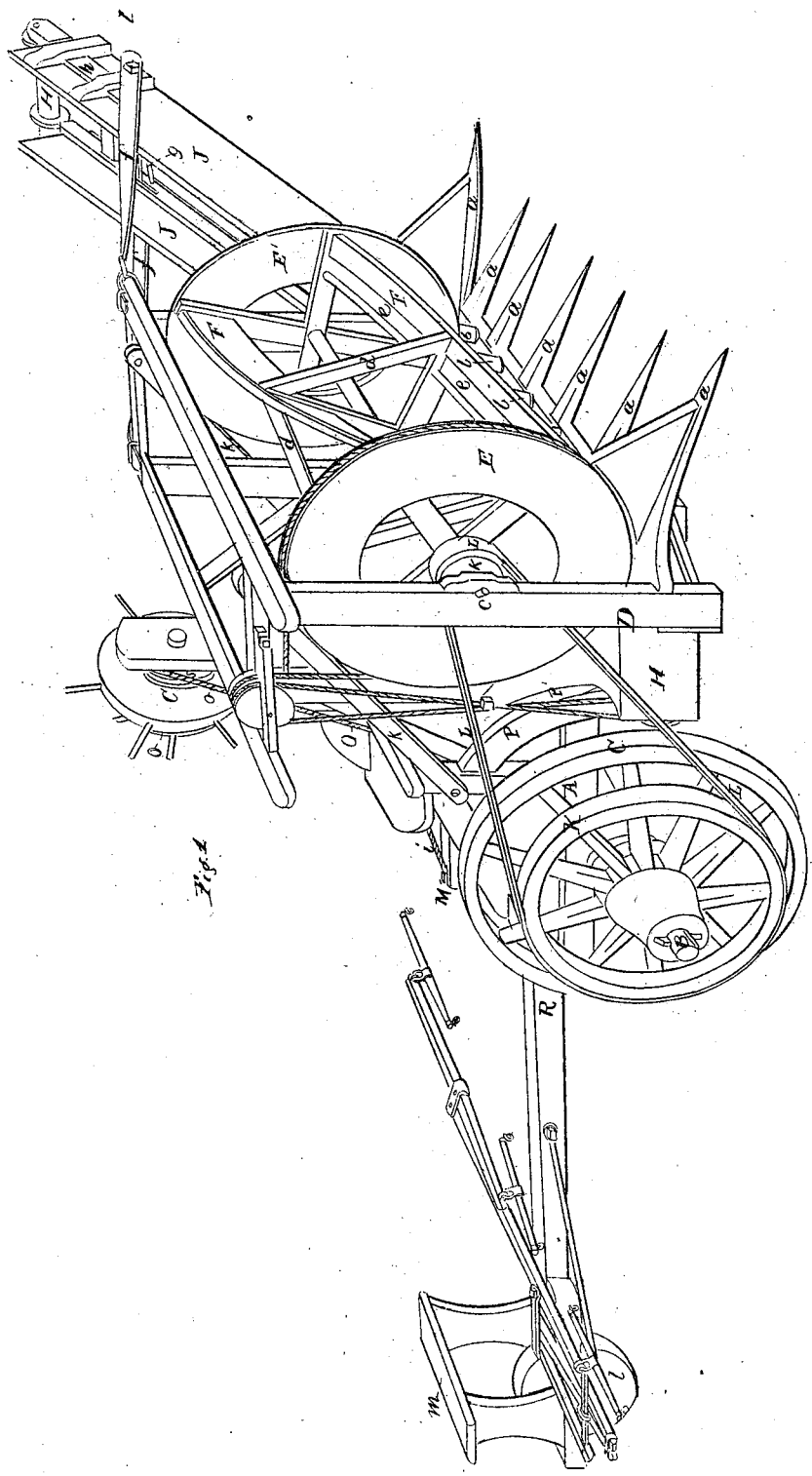

UNITED STATES PATENT OFFICE.

PELLS MANNY, OF WADDAM'S GROVE, ILLINOIS.

IMPROVEMENT IN HARVESTERS.

Specification forming part of Letters Patent No. 6,560, dated June 26, 1849.

*To all whom it may concern:*

Be it known that I, PELLS MANNY, of Waddam's Grove, in the county of Stephenson and State of Illinois, have invented certain new and useful Improvements in Reaping-Machines, of which the following is a full, clear, and exact description, reference being had to the accompanying drawings, forming part of this specification, in which—

Figure 1 is a perspective view of the machine complete, with the exception of the endless band for discharging the cut grain. Fig. 2 is a vertical section of a portion of the machine, showing more particularly the revolving cutters and the arrangement for raising and lowering the cutter-frame; and Figs. 3, 4, and 5 are plans of various portions of the machine, the first showing the arrangement of the pole, the second that of the stationary knives, and the last the arrangement of the tightening-roller of the endless band for discharging the cut grain.

My invention consists, first, in combining revolving spiral cutters with a series of stationary knives, the two being so arranged with respect to each other as to act on the standing grain like the cutting-edges of a common shears; second, in raising or lowering the cutter-frame in such manner that the cutters shall always act upon the grain at the angle best suited to the distance from the ground at which the straw is cut, while the band which gives motion to the revolving cutters shall be always kept equally stretched, irrespective of the position of the cutter-frame; third, in the method of altering the direction of the progressive motion of the machine upon the surface of the ground.

The general arrangement of my reaper is as follows: Fingers project from the front of the machine, which, by the progressive motion of the carriage, enter the standing grain and direct it against stationary knives placed at their bases and running diagonally from finger to finger. A series of spiral cutters, driven by a band from the wheels of the carriage, revolve immediately above the stationary knives, and, acting with them, shear off the grain. The cut grain falls upon an endless band running on rollers, also driven by the progressive motion of the machine, and by this band it is discharged into a wagon moving beside the reaper. The frame which carries the moving and stationary cutters and the discharging-band can be raised or lowered at pleasure. The pole to which the horses are attached projects from the hinder part of the carriage, its projecting extremity being supported by a wheel. It is attached to the carriage by a pivot on which it turns, and has two ropes attached to its extremity within the carriage, which, proceeding in opposite directions to the sides of the carriage, pass round sheaves thereunto attached, and are returned toward each other and wound in opposite directions upon the barrel of a windlass. By applying the hands to the spokes of the windlass the pole is moved in either direction from the central line passing through the pivot in the same manner as the tiller of a vessel is worked.

In the drawings, A is the framing of the carriage, B being the axle-tree, on which the wheels C revolve. At the front end of the machine is the cutter-frame D. From the lower part of this frame fingers $a$ are projected forward, to whose bases stationary knives $b$ are attached, which extend diagonally across the spaces between the fingers.

Directly above the stationary knives is the shaft $c'$ of the skeleton drum, to which the moving cutters are attached. This drum is formed of two heads, E E', mounted on the opposite extremities of the same shaft, $c'$, and connected by longitudinal pieces F, extending spirally from one head, E, to the other, E'. These pieces are connected with each other by suitable braces, $d$, and to them the moving spiral cutters $e$ are attached. These cutters are made of thin sheet metal, and are so arranged that in passing over the edges of the stationary knives $b$ an angle shall be formed between the edges of the two, the moving cutters first meeting the stationary knives at these parts of their edges, which by their diagonal position project farthest into the standing grain, and advancing backward toward the inner angle formed by the stationary knife and the finger to which its inner extremity is attached, thus shearing the grain in the same manner as the edges of an ordinary shears cut. It is important that the stationary cutting-edge should be composed of a series of knives instead of one unbroken edge, first, because the cutter-frame can be shorter, (in the direction of the motion of the carriage;) and, second, when the knives become dull a less amount of grain accumulates at the inner angles formed by them with the fingers, and the power exerted to cut such accumulation of grain will be less than if the stationary cutter was one unbroken edge, in the ratio of the number of divisions in the series. The cut grain is carried backward by the revolving cutter and discharged upon an endless band running on rollers H H' transversely across the machine and projecting beyond its side at I. The outer roller of this band is supported by an adjustable frame, J, hinged at its inner extremity to the cutter-frame D. The projecting extremity is connected with the upper part of the cutter-frame and supported by straps $f$, which may be shortened or lengthened to elevate or depress the projecting extremity of the roller-frame J. The roller H', at the projecting extremity of the frame J, is not fixed, but is continually forced outward by springs $g$, acting upon the sliding supports $h$ of its axis, so as to keep the discharging band constantly tight. The revolving cutter-drum is driven from one of the carriage-wheels by a belt, L, which passes over a belt-pulley, K, secured to the spokes of the carriage-wheel, and over a second pulley, K', on the shaft of the cutter-drum.

The cutter-frame D is suspended from one extremity of the lever M by the links N, connecting the two. To the opposite end of this lever M a rope, $i$, is attached, which, proceeding downward, passes under a sheave, $j$, attached to the frame of the carriage, and thence returning upward and passing over a second sheave in the extremity of the lever, (by which its direction is changed,) and under a third sheave on the carriage, is brought upward and around upon the barrel of a windlass, O, by turning which the cutter-frame is raised or lowered.

In order to regulate the angle at which the stationary cutters meet the grain in the several positions of the cutter-frame, and at the same time to keep the driving-belt L always equally strained, I have invented the following arrangement: Circular ways P, concentric with the axis of the wheels, are attached to the frame of the carriage, and corresponding ones, P', to the cutter-frame. D, whose centers coincide with that of the shaft of the cutter-drum E. These latter slide upon the former, and as the circular ways are concentric with the pulley-wheels K K' the distance between the axes of the latter will not be altered by raising or depressing the cutter-frame, and the driving-belt L, surrounding the two, will always be equally strained. In order that the stationary knives $b$ may always meet the grain at a proper angle, I attach the upper part of the cutter-frame to the framing of the carriage by two radius-bars, $k$, one corresponding with each set of circular ways, and the length of these is such, with relation to the distance between the axle-tree of the carriage and the shaft of the cutter-drum, that when the cutter is acting on grain near the surface of the ground the direction of the stationary knives shall be slightly inclined downward and when the cutters are acting at some distance above the surface of the ground the stationary knives shall have an upward inclination, thus being always placed at the most advantageous angle for cutting the grain.

The pole R, to which the team is attached, projects from the hinder part of the carriage, and has its projecting extremity, to which the whiffletree is attached, supported by a wheel, $l$, above which is the seat $m$ of the driver. In order to direct the reaper, I attach the pole R to the carriage by a pivot, $n$, on which it can be moved horizontally in either direction from the central line of the machine. The inner extremity, $r$, of the pole projects within the pivot $n$ and has two ropes, $o$ $o'$, attached to it, which, proceeding horizontally in opposite directions, pass under sheaves $p$ $p'$, attached to the outer framing of the carriage, and thence, returning inward and upward, are wound in opposite directions upon the drum $s$ of a windlass, O'. The hands of the director are applied to the spokes of the windlass-wheel O', and, acting through the ropes $o$ $o'$, haul the inner extremity of the pole to either side in the same manner as the tiller of a vessel is turned for the purpose of steering.

What I claim as my invention, and desire to secure by Letters Patent, is—

1. Arranging a series of inclined knives, $b$, diagonally across the spaces between the fingers $a$, the front end of the cutting-edge of one knife projecting beyond the rear end of the cutting-edge of the one next succeeding it, substantially as herein described, and acting in combination with revolving spiral cutters $e$.

2. Attaching the pole, to whose hinder extremity the team is attached, to the hinder part of the carriage by a pivot, $n$, in combination with the ropes $o$ $o'$ and windlass O', by which it is turned, by which arrangement the machine can be turned in a small space and without inconveniencing the team.

PELLS MANNY.

Witnesses:
E. S. RENWICK,
P. H. WATSON.